(12) United States Patent
Fry et al.

(10) Patent No.: US 12,240,167 B2
(45) Date of Patent: Mar. 4, 2025

(54) AMORPHOUS THERMOPLASTIC ADDITIVE MANUFACTURED ARTICLES AND METHOD TO MAKE THEM

(71) Applicant: LUMAS Polymers LLC, Chaska, MN (US)

(72) Inventors: Thomas Fry, Victoria, MN (US); John G. Eue, St. Louis Park, MN (US)

(73) Assignee: LUMAS Polymers LLC, Chaska, MN (US)

( * ) Notice: Subject to any disclaimer, the term of this patent is extended or adjusted under 35 U.S.C. 154(b) by 0 days.

(21) Appl. No.: 18/564,452

(22) PCT Filed: Jun. 3, 2022

(86) PCT No.: PCT/US2022/032173
§ 371 (c)(1),
(2) Date: Nov. 27, 2023

(87) PCT Pub. No.: WO2022/260952
PCT Pub. Date: Dec. 15, 2022

(65) Prior Publication Data
US 2024/0254327 A1    Aug. 1, 2024

Related U.S. Application Data

(60) Provisional application No. 63/208,243, filed on Jun. 8, 2021.

(51) Int. Cl.
*B29C 64/153* (2017.01)
*B29C 64/314* (2017.01)
(Continued)

(52) U.S. Cl.
CPC .......... *B29C 64/153* (2017.08); *B29C 64/314* (2017.08); *B29C 71/0063* (2013.01);
(Continued)

(58) Field of Classification Search
CPC .............. B29C 64/153; B29K 2033/12; B29K 2105/251; B29K 2995/0039; B29K 2995/004; B33Y 70/00; B33Y 10/00
See application file for complete search history.

(56) References Cited

U.S. PATENT DOCUMENTS

| 4,217,426 A | 8/1980 | McConnell et al. |
| 5,391,640 A | 2/1995 | Akkapeddi et al. |

(Continued)

FOREIGN PATENT DOCUMENTS

| JP | 2015155491 | 5/2020 |
| KR | 1792664 B1 | 11/2017 |

(Continued)

OTHER PUBLICATIONS

Canetti, Maurizio et al., "Miscible Blends of Polylactide and Poly(methyl methacrylate): Morphology, Structure, and Thermal Behavior." Journal of Polymer Science, Part B: P:olymer Physics 2014, 52, 1168-1177 (10 pages).

(Continued)

*Primary Examiner* — Nahida Sultana
(74) *Attorney, Agent, or Firm* — Young Basile Hanlon & MacFarlane, P.C.

(57) ABSTRACT

A semi-crystalline blended polymer useful for additive manufacturing is comprised of an amorphous thermoplastic polymer and a thermoplastic semi-crystalline polymer, each of the polymers being essentially miscible in the other and being blended at a weight ratio of amorphous polymer/semi-crystalline polymer of greater that 1 to about 20. The semi-crystalline blended polymer displays a DSC melt peak enthalpy of at least about 3 joules/g. The semi-crystalline polymer may be made by blending the aforementioned polymers at the weight ratio and subject to heating between the melt temperature of the semi-crystalline polymer and the glass transition temperature of the amorphous polymer. The (Continued)

semi-crystalline blended polymer may revert to essentially an amorphous polymer when additive manufactured by fusing layers of said polymer powders together.

11 Claims, 5 Drawing Sheets

(51) Int. Cl.
*B29C 71/00* (2006.01)
*B33Y 10/00* (2015.01)
*B33Y 70/00* (2020.01)
*C08J 3/00* (2006.01)
*C08L 33/12* (2006.01)
*B29K 33/00* (2006.01)
*B29K 67/00* (2006.01)
*B29K 77/00* (2006.01)
*B29K 105/00* (2006.01)

(52) U.S. Cl.
CPC .............. *C08J 3/005* (2013.01); *C08L 33/12* (2013.01); *B29K 2033/12* (2013.01); *B29K 2067/00* (2013.01); *B29K 2077/00* (2013.01); *B29K 2105/251* (2013.01); *B29K 2995/0039* (2013.01); *B29K 2995/004* (2013.01); *B33Y 10/00* (2014.12); *B33Y 70/00* (2014.12); *C08J 2333/12* (2013.01); *C08J 2467/04* (2013.01)

(56) References Cited

U.S. PATENT DOCUMENTS

| | | | |
|---|---|---|---|
| 5,401,446 A | 3/1995 | Tsai et al. | |
| 5,597,589 A | 1/1997 | Deckard | |
| 6,927,184 B1 | 8/2005 | Jacobs-Hartwig et al. | |
| 7,208,550 B2 | 4/2007 | Mather et al. | |
| 7,371,799 B2 | 5/2008 | Mather et al. | |
| 7,795,350 B2 | 9/2010 | Mather et al. | |
| 7,807,591 B2 | 10/2010 | Fox et al. | |
| 7,858,163 B2 | 12/2010 | Angadjivand et al. | |
| 7,902,096 B2 | 3/2011 | Brandner et al. | |
| 7,905,973 B2 | 3/2011 | Stelter et al. | |
| 9,139,940 B2 | 9/2015 | Berrigan et al. | |
| 9,592,530 B2 | 3/2017 | Rodgers | |
| 9,731,045 B2 | 8/2017 | Gall et al. | |
| 9,744,722 B2 | 8/2017 | Rodgers | |
| 9,770,058 B2 | 9/2017 | Angadjivand et al. | |
| 9,925,714 B2 | 3/2018 | Rodgers et al. | |
| 10,575,571 B2 | 3/2020 | Angadjivand et al. | |
| 10,781,311 B2 | 9/2020 | Rodgers et al. | |
| 11,555,104 B2 * | 1/2023 | Szala ................... | C08L 51/003 |
| 11,713,393 B2 * | 8/2023 | Gabriel ................. | C08L 67/02 |
| | | | 264/497 |
| 2003/0130364 A1 * | 7/2003 | Vo ........................ | C08J 9/127 |
| | | | 521/82 |
| 2004/0122174 A1 | 6/2004 | Mather et al. | |
| 2006/0079145 A1 | 4/2006 | Cox | |
| 2007/0238056 A1 * | 10/2007 | Baumann ............... | B22F 12/41 |
| | | | 430/325 |
| 2011/0033665 A1 | 2/2011 | Montanari et al. | |
| 2014/0268604 A1 * | 9/2014 | Wicker .................. | B29C 70/82 |
| | | | 264/445 |
| 2015/0145168 A1 | 5/2015 | Rodgers et al. | |
| 2016/0304677 A1 | 10/2016 | Evans et al. | |
| 2017/0096576 A1 | 4/2017 | Bheda et al. | |
| 2017/0198104 A1 | 7/2017 | Bheda et al. | |
| 2017/0312938 A1 | 11/2017 | Brule et al. | |
| 2019/0153995 A1 * | 5/2019 | Tobin .................... | B29C 70/302 |
| 2019/0185662 A1 | 6/2019 | Zhou et al. | |
| 2020/0062952 A1 | 2/2020 | Nguyen et al. | |
| 2020/0165495 A1 * | 5/2020 | Corzani ................. | A61F 13/49 |
| 2020/0291227 A1 | 9/2020 | Kunkel et al. | |
| 2021/0129383 A1 * | 5/2021 | Pfister .................... | B29B 7/16 |
| 2021/0178680 A1 | 6/2021 | Acosta et al. | |
| 2021/0332232 A1 | 10/2021 | Gabriel et al. | |
| 2022/0016828 A1 * | 1/2022 | Rodgers ................ | B29B 13/022 |

FOREIGN PATENT DOCUMENTS

| | | |
|---|---|---|
| KR | 20210053916 | 5/2021 |
| WO | 2008122426 A2 | 10/2008 |
| WO | 2013080788 A1 | 6/2013 |
| WO | 2015081009 A1 | 6/2015 |
| WO | 2017033146 A1 | 3/2017 |
| WO | 2019083640 A1 | 5/2019 |
| WO | 2019109203 A1 | 6/2019 |
| WO | 2020006061 A1 | 1/2020 |
| WO | 2020043573 A1 | 3/2020 |

OTHER PUBLICATIONS

Zhao, Xipo et al., "Super tough poly(lactic acid) blends: a comprehensive review." RSC Adv., 2020, 10, 13316 (53 pages).
Plexiglas by Arkema. Acrylic Resins Product Guide, 6 pages.
UserCom Information. Informatin for users of Mettler Toledo thermal analysis systems (28 pages).
TOPAS® COOC Cyclic Olefin Copoloymer brochure (20 pages).

* cited by examiner

AMORPHOUS THERMOPLASTIC ADDITIVE MANUFACTURED ARTICLES AND METHOD TO MAKE THEM

FIELD OF THE DISCLOSURE

The present disclosure relates to additive manufactured articles comprised of thermoplastic polymers that are amorphous. In particular, the invention relates to selective laser sintering of thermoplastic polymers that revert to essentially an amorphous thermoplastic polymer after forming the additive article.

BACKGROUND

Selective laser sintering or melting (SLS or SLM) has been used to make 3d parts by selectively sintering powders in a bed of powder (see, for example, U.S. Pat. No. 5,597,589). In this method, a bed of powder maintained at elevated temperatures is selectively sintered using a $CO_2$ laser or other electromagnetic radiation source. Once a first layer has been sintered, a further layer of powder is metered out and the selective sintering repeated until the desired 3d part is made. Since the powder must be sintered or melted, SLS has been limited by the need to use crystalline or semi-crystalline polymers having a discreet melting point, precluding the use of amorphous polymers having desirable properties such as optical transparency, toughness and elongation before breakage.

Recently, approaches have been described to partially crystallize amorphous polymers (e.g., polycarbonate and polyphenylsulfone) by dissolving amorphous polymers in solvents at elevated temperatures. (see, for example, WO2020/006061 and WO2017/033146). The use of a solvent, however, inevitably leads to a residual amount of solvent retained in the crystallized polymer that may preclude its use in bio compatible applications and require environmental mitigation when be used to form additive manufactured products.

Accordingly, it would be desirable to provide a polymer that is semicrystalline that may be additive manufactured into an amorphous polymeric article that avoids one or more of the problems of the prior art such as those described above.

SUMMARY OF THE INVENTION

It has been discovered that certain amorphous thermoplastic polymers when blended with certain crystalline or semicrystalline thermoplastic polymers in appropriate proportions and heat-treated sufficiently realizes a semi-crystalline thermoplastic polymer suitable for additive manufacturing processes such as SLS. Surprisingly, these semi-crystalline polymer blends when additive manufactured revert to substantially amorphous polymeric articles with the desirable properties of an amorphous polymer without any residual solvent.

An aspect of the invention is a semi-crystalline blended polymer comprising, an amorphous thermoplastic polymer and a thermoplastic semi-crystalline polymer, each of the polymers being essentially miscible in the other and being blended at a weight ratio of amorphous polymer/semi-crystalline polymer of greater than 1 to 20 and said blended semi-crystalline polymer displaying a DSC melt peak enthalpy of at least about 5 joules/g. The blended semicrystalline powder may be a powder suitable for additive manufacturing methods such as SLS. The enthalpy of the DSC melt peak is determined according to the manner described by ASTM D3418.

A second aspect of the invention is a method of forming a semi-crystalline blended polymer comprising:
a. melt blending an amorphous thermoplastic polymer and a thermoplastic semi-crystalline polymer, each of the polymers being essentially miscible in the other, at a weight ratio of the amorphous polymer/semi-crystalline polymer that is greater than 1 to about 20 to form a blended polymer, and
b. heat-treating the blended polymer at a temperature above the glass transition temperature of the amorphous polymer but below the melt temperature of the semicrystalline polymer for a time sufficient to crystallize the blended polymer sufficiently to realize the semi-crystalline blended polymer.

Further processing of the semi-crystalline polymer may be performed such as size reduction to produce a powder that is useful for additive manufacturing methods such as SLS.

A third aspect of the invention is A method of forming an additive manufactured article comprising,
a. spreading a layer of powder of the thermoplastic semicrystalline blended polymer of the first and second aspect,
b. heating and fusing the particles of the layer in a controlled manner by directed electromagnetic radiation,
c. spreading subsequent layers of the semicrystalline blended powder and fusing each layer to the prior layer in a controlled manner by directed electromagnetic radiation to form the additive manufactured article.

The additive article surprisingly may be substantially amorphous as determined by differential scanning calorimetry (DSC) at a heating or cooling rate of 20° C./min. Whenever DSC is referenced herein, the heating and cooling rate is understood to be 20° C./min, unless specifically stated otherwise.

A fourth aspect of the invention is an additive manufactured article comprised of the thermoplastic semicrystalline blended polymer of the first aspect that has been reverted to a substantially amorphous polymer (i.e., essentially fails to display a discreet DSC melting heat of enthalpy peak). It is not entirely clear why the semi-crystalline powder after being heated and fusing by electromagnetic radiation, but, without being limiting in any way, the heating above the melt temperature and rapid cooling may disrupt the crystalline structure without allowing subsequent reordering upon cool down due to the blended polymers being miscible and primarily being comprised of the amorphous polymer.

DETAILED DESCRIPTION

The method to realize the semi-crystalline blended polymer of this invention without any residual solvent, comprises melt blending an amorphous thermoplastic polymer and thermoplastic semi-crystalline polymer to form a blended polymer. The polymers are essentially miscible with each other. Essentially miscible means that that there is not distinctly different glass transition temperature as determined by DSC. Generally, after compounding the blended copolymer fails to display a distinct heat of enthalpy melt peak. Even so, there may be such a peak, but generally it is not sufficient to realize good powder sintered parts (e.g., the peak is less than about 1 joule/gram or is too indistinct).

The amorphous polymer and semi-crystalline polymer are mixed in a weight ratio such that the blend is primarily comprised of the amorphous polymer, but with enough semi-crystalline polymer to sufficiently initiate crystallization of the blended polymer. The weight ratio of the amorphous polymer/semi-crystalline polymer mixed and blended is greater than 1 to about 20. Desirably, the ratio is about 2 or 3 to about 15 or 10.

The semi-crystalline polymer may be any thermoplastic organic polymer displaying at least about 5% crystallinity to essentially fully crystalline when heating and cooling at rates commonly experienced when forming or compounding such polymers (e.g., heating and cooling rates from ambient temperature ~25° C. to the melting temperature). That is, the polymer displays crystallinity without forced crystallization methods such as those known in the art (e.g., solvent induced crystallization and the like). Generally, the amount of crystallinity is at least about 5%, 10%, 15% or 20% to about 95%, 75%, 50% or 30%. The crystallinity may be determined by any suitable methods such as those known in the art. Illustratively, the percent crystallinity may be determined by x-ray diffraction including, for example, wide angle x-ray diffraction (WAXD), such as by using a Rigaku SmartLab x-ray diffractometer, or by differential scanning calorimetry (DSC), such as by using a TA Instruments DSC250 differential scanning calorimeter ASTM D3418-15. Exemplary crystalline polymers may, depending on the chain structure, include certain polyesters, polycarbonates, polyamides, and the like.

The amorphous polymer may be any thermoplastic organic polymer displaying essentially no (trace if any detectable) crystallinity when heating and cooling at rates and measured as described in the previous paragraph with 20° C./minute being exemplary as previously described. Exemplary amorphous polymer may, depending on the chain structure, include certain polyester, polycarbonates, polyamides and the like.

The melt blending of the amorphous and semi-crystalline polymer may be performed any suitable method and apparatus such as those known in the art. Examples include high intensity mixers and screw extruders (e.g., single and twin screw extruders). The amount of shear may be any useful to facilitate the blending and compounding to form the polymer blend. The extruder may be held at one temperature or have a gradient along the length of the extruder to facilitate compounding of the two polymers. The temperature may be any that is sufficient to form a polymer blend, for example, just below the temperature where a particular condensation polymer starts to degrade. Typically, the temperature may be a temperature that is 100° C., 50° C., or 25° C. within the melting temperature of the semi-crystalline polymer. Typical temperatures may be from about 150° C., 175° C., or 200° C. to about 300° C. or 250° C. The shear may be any as typically used in the practice of compounding polymers in compounding extruders. The time likewise may be any time sufficient to realize blended polymer wherein the polymers are uniformly dissolved in each other (miscible as described above). Typical times may be from 1 to 2 minutes to an hour or so. The blended polymer may be extruded and shaped into any useful shape to form the semi-crystalline blended polymer such as pellets of any shape.

The blended polymer is heat treated at a crystallizing temperature above the glass transition temperature of the amorphous polymer but below the melt temperature of the semicrystalline polymer for a time to crystallize the blended polymer sufficiently to realize the semi-crystalline blended polymer. The atmosphere may be any useful atmosphere, with air, being acceptable for the most part unless degradation may occur to one of the polymers present in the blended polymer, which may employ a gas absent water or oxygen (e.g., nitrogen, dry air, noble gas or combination thereof as well as vacuum).

The heating treating may be performed by any suitable method or device or combination thereof. For example, the heating may be performed in a batch or continuous oven where the thermal energy is derived from any manner such as those known in the art (e.g., resistance, combustion, inductive, radiative heating or thermal transfer heating). The heating may be performed in the blending extruder used to form the blended polymer, but generally it is desirable to separate these processes for efficiency resulting from among other things more efficient and uniform thermal transfer without disrupting shear, which may hinder the desired crystallization.

The crystallizing temperature is above the glass transition temperature (Tg) of the amorphous polymer and below melt temperature (Tm) of the semi-crystalline polymer. The Tg of the amorphous polymer is lower than Tm of the semi-crystalline polymer. Generally, the Tg of the amorphous polymer is about 20° C. to 150 or 250° C. below Tm. The crystallizing temperature may be a single temperature or varied during the heat treating between Tg and Tm. For example, the crystallizing temperature may be ramped up or down and held at differing temperatures between Tg and Tm or slowly ramped within this temperature range for the heat treating time. Illustratively, the Tg of the amorphous polymer is from about 60° C., 80° C. or 100° C. to about 140° C. or 120° C. and the semi-crystalline polymer has a Tm of at least about 160° C. to about 300° C., 250° C., 225° C., 200° C. or 180° C. The Tm is determined from the melt peak of the DSC by as described by ASTM D3418 using the midpoint of the melt peak. The Tg of the amorphous polymer is determined from the DSC plot by ASTM D3418 using the midpoint of the glass transition temperature.

The heat treating time may be any time that is sufficient to form the semi-crystalline blended polymer and may vary somewhat depending on the temperature used within the temperature range defined by Tg of the amorphous polymer and Tm of the semi-crystalline polymer. Generally, sufficient time is when the semi-crystalline blended polymer has achieved a level of crystallinity such that the heat of enthalpy of the melt peak is at least about 3 or 4 joules/gram, 5 joules/gram to any practicable amount such as about 30 joules/per gram (or essentially crystalline). Generally, the heat treating is performed for at least 2, 4, 6, or 8 hours to 48, 36 or 24 hours in the absence of any solvent.

After the heat-treating, the semi-crystalline blended polymer may be comminuted to a desired size for use in a particular additive manufacturing method such as SLS. Illustratively, the semi-crystalline blended polymer may be comminuted and classified such that it has a particle size that is useful for making additive manufactured articles, and typically has a median particle size ($D_{50}$), by volume, from about 1 micrometer (μm), 10 μm, 20 μm or 30 μm to 150 μm, 125 μm, 100 μm or 90 μm. Likewise, to enable consistent heating and fusion of the powder, it desirably has a $D_{90}$ of at most 300 μm, 200 μm or 150 μm and a $D_{10}$ of at least 0.1 μm, 0.5 μm or 1 μm by volume. $D_{90}$ means the particle size (equivalent spherical diameter) in the particle size distribution, where 90% by volume of the particles are less than or equal to that size; similarly, $D_{50}$ means the particle size (equivalent spherical diameter) in the particle size distribution, where at least 50% by volume of the particles are less than that size, and $D_{10}$ means the particle size (equivalent spherical diameter) in the particle size distribution, where at least 10% by volume of the particles are less than that size. The particle size may be determined by any suitable method such as those known in the art including, for example, laser diffraction or image analysis of micrographs of a sufficient number of particles (~100 to ~200 particles). A representative laser diffractometer is one produced by Microtrac such as the Microtrac S3500.

The comminution may be carried out by any suitable method such as those known in the art. Illustratively, milling at a temperature where the semi-crystalline polymer becomes embrittled may be used such as commonly referred to as cryomilling. Generally, the temperature for cryomilling may be any temperature below about 0° C., −25° C., −50° C. to about −75° C., −100° C., −150° C., or −190° C. The cooling may be provided any suitable method or means such as using dry ice or liquid nitrogen.

Illustratively a suitable pair of amorphous and semi-crystalline polymers is amorphous polymethyl methacrylate (PMMA) and semi-crystalline poly lactic acid (PLA). Another suitable pair is an amorphous polyamide and semi-crystalline polyamide (e.g., see U.S. Pat. No. 5,391,640). The PLA may be any form of PLA such as those formed using L-lactide, D-lactide, or combination thereof. Desirably, the amount of L-lactide is at least 50%, 60%, 70%, 80% or 90% to 98% or 100% (100% may include trace amounts of D-lactide) by weight of the monomer used to make the PLA. Other polyesters such as those known in the art that readily form crystalline or semi-crystalline polymers may also be used with the PMMA if miscible as described herein.

Each of the amorphous or semicrystalline polymer may have any Mw to realize a blended polymer and semi-crystalline blended polymer that has the desired characteristics. For example, the PLA may have a weight average molecular weight (Mw) of about 10 kDa to 500 kDa. The melt flow rate of the PLA may be any useful to form the blended semi-crystalline polymer. Typically, the MFR is one when combined with the PMMA realizes the desired characteristics of the semi-crystalline blended polymer. Generally, the MFRs may be from 25, 50, 60 or 70 to 90, 100, 125 or 150 grams (210° C./10 min, 2.16 kg). Examples of suitable PLAs are available under the tradename INGEO Biopolymer 625F and 3260HP from NatureWorks LLC and LUMINY L105 from Total Corbion PLA.

The PMMA may be any suitable PMMA such as those known in the art and may have a Mw that varies over a wide range such as from 10 kDa to 3 MDa so long as the PMMA exhibits rheological behavior allowing for the desired degree of crystallinity of the semi-crystalline blended polymer (sufficient melt heat of enthalpy) of the PLA/PMMA semi-crystalline blended polymer. The PMMA may be made with a small percentage (e.g., less than about 5%, 2%, or 1%) of comonomers such as those commonly used in the art (e.g., methyl acrylate, butyl acrylate and the like) to improve one or more properties such as impact strength or heat stability. The melt flow rate of the PMMA may be any useful MFR to form the semi-crystalline blended polymer and ultimately the additive manufactured article therefrom. Typically, the MFR of the PMMA is one, when combined with the PLA, desired enthalpy heat and properties of the additive manufactured article. Generally, the MFR of the PMMA may be from 1, 2, 5, or 10 to 100, 50, 40 or 30 grams (230° C./10 min, 3.8 kg). Examples of PMMAs that may be useful include those available under the tradename designation CA41 from PLASKOLITE and those available under the tradename PLEXIGLAS VM, VS and VSUVT from Arkema.

The semi-crystalline blended polymer may be comprised of further optional components that may be useful, for example, for making additive manufactured articles or impart some particular property. It is understood that the optional components may be present in any useful amount so long as the weight ratio of the amorphous polymer/semi-crystalline polymer is within the range described herein. For example, the optional components may be from 1%, 2%, 5% or 10% to 90%, 75%, 50%, or 30% by weight of the semi-crystalline blended polymer and optional components.

Examples of optional components include fillers, flow agents, and coloring agents, toners, extenders, colorants (e.g., pigments and dyes), lubricants, anticorrosion agents, thixotropic agents, dispersing agents, antioxidants, adhesion promoters, light stabilizers, organic solvents, surfactants, flame retardants, anti-static agents, plasticizers or a combination thereof.

Surprisingly, it has been discovered that the semi-crystalline blended polymer is particularly useful to make an essentially amorphous additive manufactured article even though it has sufficient crystallinity enabling the printing of articles from a sequential fusing of powder layers. It is understood that, when referring to the additive manufactured article being amorphous, this refers to the semi-crystalline polymer having reverted to an amorphous polymer as opposed to any optional components exhibiting crystallinity. In particular, the semi-crystalline blended polymer is useful additive manufacturing methods involving fusing of particulates in and between subsequent powder layers by application of directed electromagnetic radiation such as in SLS. The additive article may, if desired, be heat treated as described herein to re-crystallize the semi-crystalline blended polymer that reverted to an amorphous state during additive manufacturing of the article.

EXAMPLES

Example 1

Figure 1:
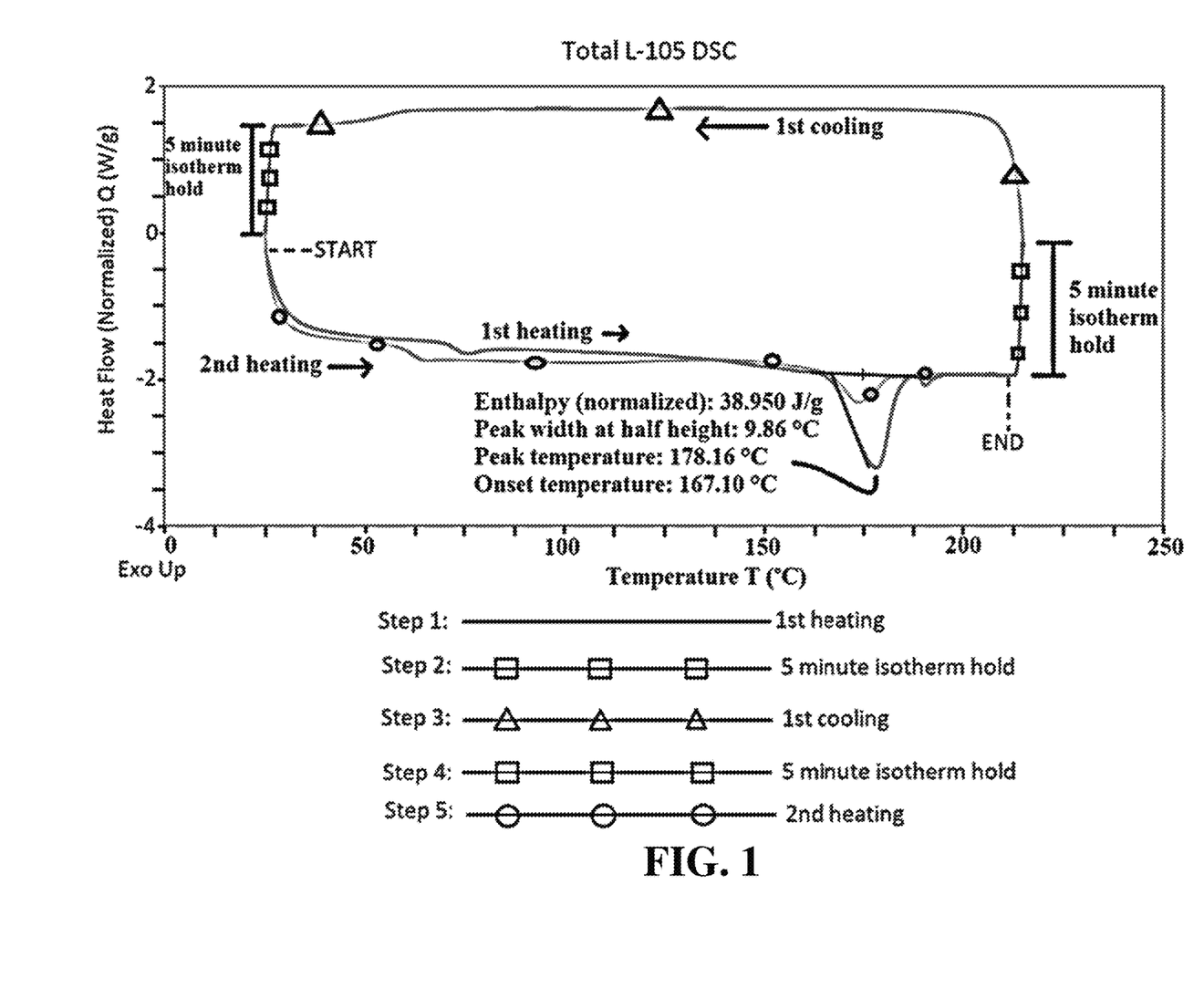
FIG. 1: Is a DSC curve of a semi-crystalline thermoplastic polymer used to make the semi-crystalline blended polymer of the present invention.
Figure 2:
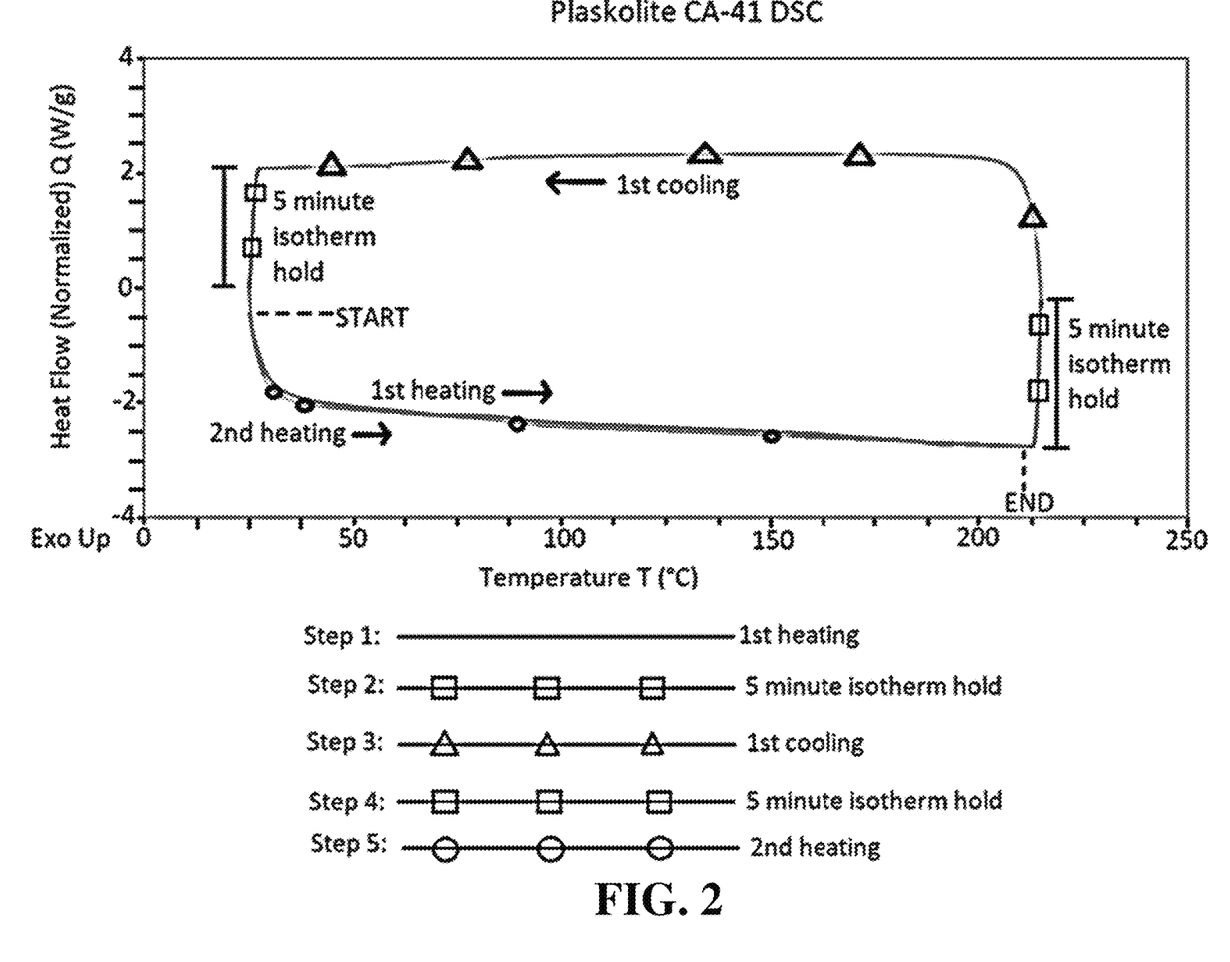
FIG. 2: Is a DSC curve of an amorphous thermoplastic polymer used to make the semi-crystalline blended polymer of the present invention.
Figure 3:
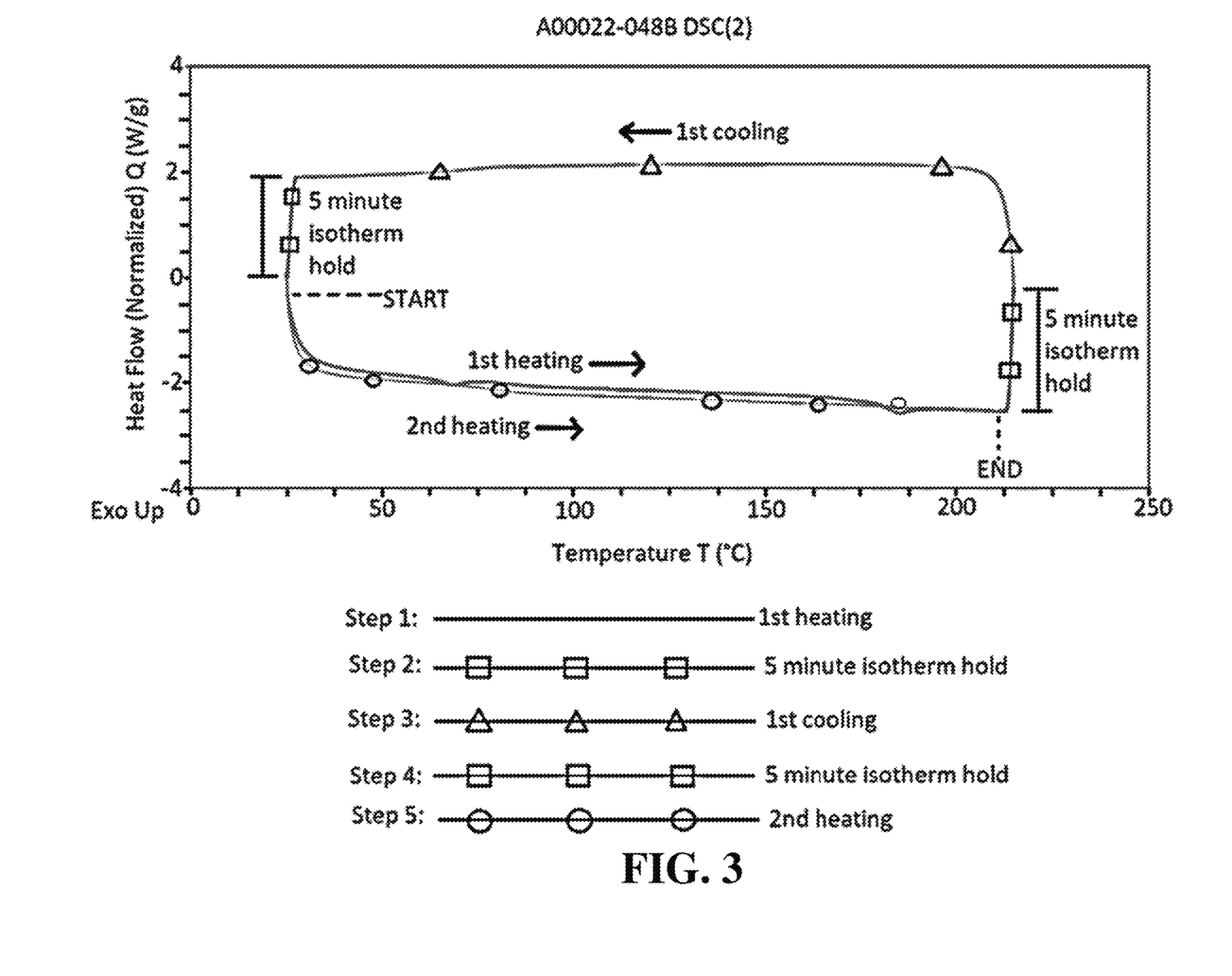
FIG. 3: Is a DSC curve of a blended polymer (15% semi-crystalline polymer and 85% amorphous polymer) prior to heat-treating to form the semi-crystalline blended polymer of the present invention.

A blended polymer is formed by mixing 85% by weight PMMA available from Plaskolite, under the trade designation CA-41.and 15% by weight PLA Total under the tradename Luminy L-105 in a twin screw extruder at 215° C.-205° C., 400 RPM, 27 mm diameter barrel and 40 to 1 length to diameter ratio to form cylindrical pellets having a diameter of 1-3 mm and length of 2-4 mm. FIG. 1 shows the DSC plot for the PLA used to make the blended polymer. The PLA has a degree of crystallinity of about 42% as determined from the DSC plot in FIG. 1. FIG. 2 shows the DSC curve of the PMMA (Plaskolite CA-41) used to make the blended polymer displaying no crystalline melt or recrystallization peak. FIG. 3 shows the DSC curve of the blended polymer. From these curves it is readily apparent that the blended polymer is essentially amorphous as is the PMMA.

Figure 4:
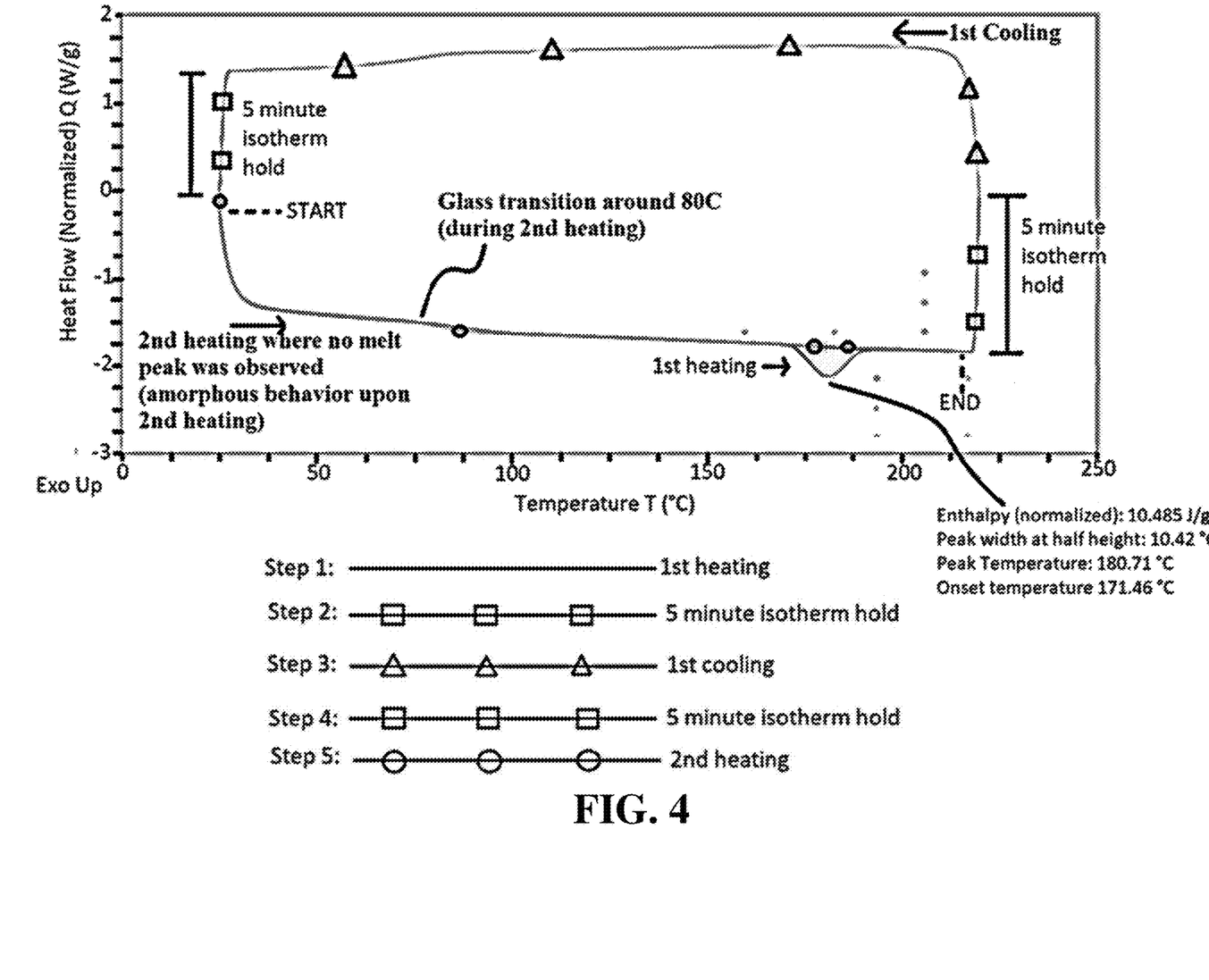
FIG. 4: Is a DSC curve of the semi-crystalline blended polymer of the present invention (i.e., after heat treating).

To make the semi-crystalline blended polymer the blended polymer is heat treated at 155° C. for 30 hours in a convection oven in air on trays. The semi-crystalline blended polymer DSC plot is shown in FIG. 4, where it is readily apparent that upon heating, the semi-crystalline blended polymer has a distinct enthalpy peak due to melting with a heat of enthalpy of about 10.5 joules/gram and Peak temperature (herein interchangeably referred to as Tm). Upon cooling and reheating, said melt peak disappears indicating that said blended polymer reverts to an amorphous state.

The semi-crystalline blended polymer is cryomilled using liquid nitrogen as the coolant. After milling, the powder has a D10 of 7.19 micrometers, D90 of 26.07 micrometers and D50 of 11.01 micrometers by number after sieving any larger particles or agglomerates greater than 250 micrometers. A flow aid, Aerosil A200 (fumed silica) flow aid is added to the powder at 0.5% by weight of the powder and flow aid and mixed in 20 liter Henschel mixer. The mixing in the Henschel mixer further reduced the particle size with the D10, D50 and D90 being 7.23 micrometer, 11.38 micrometers and 28.04 micrometers to form semi-crystalline blended polymer powder.

Figure 5:
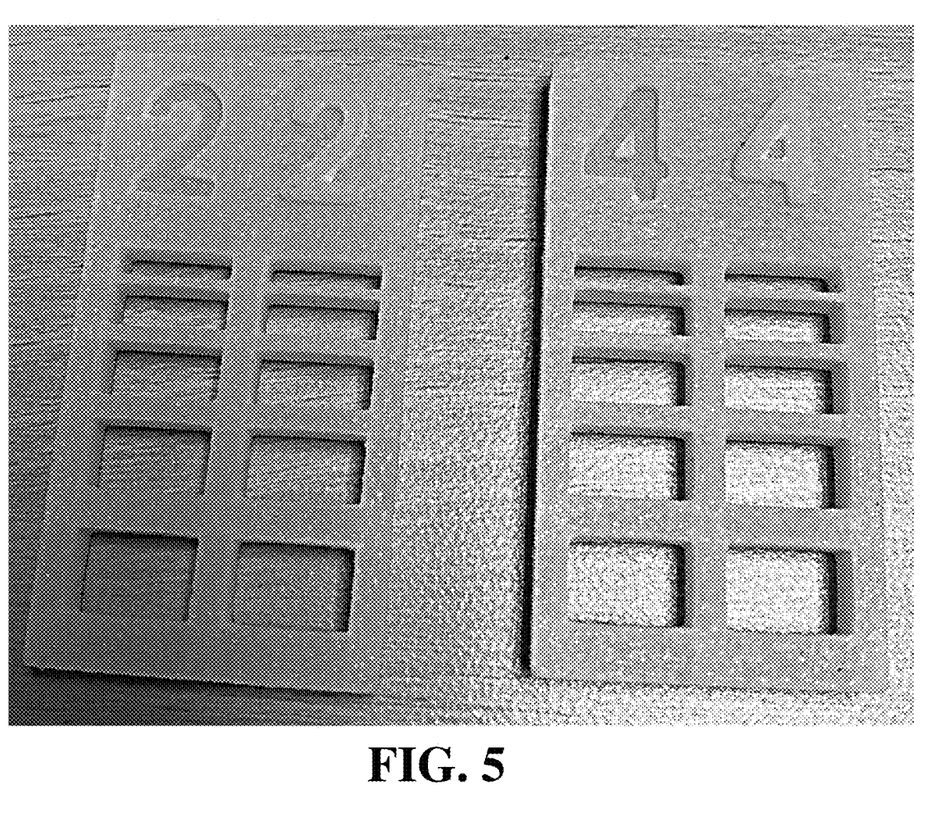
FIG. 5: Are examples of additive manufactured articles of this invention having optical transparency.

An additive manufactured article is produced using the aforementioned powder using a Farsoon 252P SLS additive manufacturing printer. The bed temperature is set at 122.5° C., which is significantly below the Tm and onset melt temperature (beginning of the DSC melt peak) due to the small particle size. The additive manufactured parts are printed in test articles as shown in FIG. 5, which have some porosity, yet are somewhat transparent and display good mechanical properties (elastic modulus of 2800 MPa, Tensile strength of 35 MPa and Elongation at break of 1.5%.

What is claimed is:

1. A method of forming a semi-crystalline blended polymer comprising:
   a. melt blending an amorphous thermoplastic polymer and a thermoplastic semi-crystalline polymer, each of the polymers being essentially miscible in the other, at a weight ratio of the amorphous polymer/semi-crystalline polymer that is greater than 1 to about 20 to form a blended polymer that is essentially amorphous,
   b. heat-treating the blended polymer at a crystallizing temperature above the glass transition temperature of the amorphous polymer but below the melt temperature of the semicrystalline polymer for a heat treating time to crystallize the blended polymer sufficiently to realize the semi-crystalline blended polymer, wherein at least portion of the heat treating is performed below, but within 20° C. of the melt temperature of the semi-crystalline polymer and the semicrystalline blended polymer displays a DSC melt peak enthalpy of at least about 3 joules/g, and
   c. grinding the semi-crystalline blended polymer to form a powder at a temperature where the semi-crystalline polymer becomes embrittled.

2. The method of claim 1, wherein the heat-treating is for a heat treating time of at least about 2 hours.

3. The method of claim 1, wherein the semicrystalline blended polymer reverts to a substantially amorphous polymer blend upon heating above the semi-crystalline melt blended polymer's melt temperature.

4. The method of claim 1, wherein the semi-crystalline blended polymer has a DSC melting peak enthalpy of at least about 5 Joules/g and melt temperature of at least about 140° C.

5. The method of claim 1, wherein the heat treating temperature is from about 100° C. to about 180° C.

6. The method of claim 5, wherein the heat treating temperature is at most about 175° C.

7. The method of claim 1, wherein the grinding is performed at a temperature below −50° C.

8. A method of forming an additive manufactured article comprising,
   a. spreading a layer of the powder of claim 1,
   b. heating and fusing the particles of the layer in a controlled manner by directed electromagnetic radiation,
   c. spreading subsequent layers of the semicrystalline blended powder and fusing each layer to its prior layer in a controlled manner by directed electromagnetic radiation to form the additive manufactured article.

9. The method of claim 8, wherein the additive manufactured article's polymer is essentially amorphous.

10. The method of claim 9, wherein the additive manufactured article upon exposure to heating above the glass transition temperature of the amorphous polymer for a time of at least 2 hours causes the additive manufactured article's polymer to crystallize.

11. The method of claim 1, wherein the grinding is performed at a temperature below about 0° C.

* * * * *